(12) United States Patent
Freitag et al.

(10) Patent No.: US 10,634,357 B2
(45) Date of Patent: Apr. 28, 2020

(54) SEQUENTIAL COMBUSTION WITH DILUTION GAS MIXER

(71) Applicant: Ansaldo Energia Switzerland AG, Baden (CH)

(72) Inventors: Ewald Freitag, Baden (CH); Adnan Eroglu, Untersiggenthal (CH); Michael Maurer, Bad Saeckingen (DE); Peter Stuttaford, Jupiter, FL (US)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 176 days.

(21) Appl. No.: 15/823,939

(22) Filed: Nov. 28, 2017

(65) Prior Publication Data

US 2018/0080654 A1  Mar. 22, 2018

Related U.S. Application Data

(60) Division of application No. 14/626,003, filed on Feb. 19, 2015, now Pat. No. 9,890,955, which is a
(Continued)

(30) Foreign Application Priority Data

Aug. 24, 2012  (EP) ..................... 12181736

(51) Int. Cl.
*F23R 3/34* (2006.01)
*F23R 3/06* (2006.01)
(Continued)

(52) U.S. Cl.
CPC .................. *F23R 3/34* (2013.01); *F02C 7/22* (2013.01); *F02C 7/228* (2013.01); *F23R 3/06* (2013.01);
(Continued)

(58) Field of Classification Search
CPC .. F02C 7/22; F02C 7/228; F23R 2900/00014; F23R 2900/03042; F23R 2900/03341;
(Continued)

(56) References Cited

U.S. PATENT DOCUMENTS 4,361,010 A  11/1982  Tankrikut et al.
4,446,693 A  5/1984  Pidcock et al.
(Continued)

FOREIGN PATENT DOCUMENTS

DE  19631616 A1  2/1998
DE  10312971 A1  12/2004
(Continued)

OTHER PUBLICATIONS

Translation of CH704829A2 to Robert.*
(Continued)

*Primary Examiner* — Jesse S Bogue
(74) *Attorney, Agent, or Firm* — Buchanan Ingersoll & Rooney PC

(57) ABSTRACT

The invention refers to a sequential combustor arrangement comprising a first burner, a first combustion chamber, a mixer for admixing a dilution gas via a dilution gas inlet to the hot gases leaving the first combustion chamber during operation, a second burner, and a second combustion chamber arranged sequentially in a fluid flow connection. The sequential combustor arrangement further includes four cooling zones with a cooling channel. During operation a cooling gas flows through the cooling channels. The disclosure further refers to a method for operating a gas turbine with such a sequential combustor arrangement.

15 Claims, 5 Drawing Sheets

Related U.S. Application Data continuation of application No. PCT/EP2013/058654, filed on Apr. 25, 2013.

(51) Int. Cl.
*F23R 3/20* (2006.01)
*F02C 7/22* (2006.01)
*F02C 7/228* (2006.01)
*F23R 3/42* (2006.01)

(52) U.S. Cl.
CPC .............. *F23R 3/20* (2013.01); *F23R 3/346* (2013.01); *F23R 3/42* (2013.01); *F23R 2900/00014* (2013.01); *F23R 2900/03042* (2013.01); *F23R 2900/03341* (2013.01)

(58) Field of Classification Search
CPC ...... F23R 3/06; F23R 3/20; F23R 3/34; F23R 3/346; F23R 3/42
See application file for complete search history.

(56) References Cited

U.S. PATENT DOCUMENTS

| | | | |
|---|---|---|---|
| 5,497,611 A | 3/1996 | Benz et al. | |
| 5,645,410 A * | 7/1997 | Brostmeyer | F23C 6/047 431/10 |
| 5,802,841 A | 9/1998 | Maeda | |
| 5,802,854 A * | 9/1998 | Maeda | F23R 3/346 60/737 |
| 6,341,485 B1 | 1/2002 | Liebe | |
| 7,000,396 B1 | 2/2006 | Storey | |
| 7,464,555 B2 | 12/2008 | Barchovchin et al. | |
| 7,503,178 B2 | 3/2009 | Bucker et al. | |
| 7,975,487 B2 | 7/2011 | Lockyer et al. | |
| 8,161,752 B2 * | 4/2012 | Yankowich | F23R 3/005 60/752 |
| 8,275,533 B2 * | 9/2012 | Davis, Jr. | F02C 7/22 60/39.5 |
| 8,783,008 B2 | 7/2014 | Eroglu et al. | |
| 9,551,491 B2 * | 1/2017 | Eroglu | F02C 7/22 |
| 9,885,481 B2 * | 2/2018 | Duesing | F23R 3/20 |
| 2004/0211186 A1 | 10/2004 | Stuttaford et al. | |
| 2010/0229557 A1 | 9/2010 | Matsumoto et al. | |
| 2011/0314825 A1 | 12/2011 | Stryapunin et al. | |
| 2014/0033728 A1 * | 2/2014 | Marmilic | F02C 7/141 60/772 |
| 2014/0109586 A1 * | 4/2014 | Ciani | F02C 7/12 60/772 |
| 2014/0109591 A1 * | 4/2014 | Bothien | F23M 20/005 60/791 |
| 2014/0260279 A1 | 9/2014 | DiCintio et al. | |
| 2015/0159876 A1 * | 6/2015 | Freitag | F02C 7/22 60/776 |
| 2015/0198334 A1 * | 7/2015 | Duesing | F23R 3/04 60/772 |
| 2015/0377134 A1 | 12/2015 | Maurer et al. | |
| 2016/0010867 A1 * | 1/2016 | Gao | F23R 3/346 60/776 |
| 2016/0069568 A1 * | 3/2016 | Ciani | F02C 9/18 60/772 |
| 2016/0178200 A1 * | 6/2016 | Ciani | F23R 3/34 60/772 |
| 2016/0215984 A1 * | 7/2016 | Bothien | F23R 3/06 |

FOREIGN PATENT DOCUMENTS

| | | |
|---|---|---|
| EP | 0321809 A1 | 12/1988 |
| EP | 0623786 A1 | 3/1994 |
| EP | 0669500 A1 | 1/1995 |
| EP | 0780629 A2 | 6/1997 |
| EP | 1850070 A1 | 10/2007 |
| EP | 2385303 A1 | 11/2011 |
| EP | 2722591 A1 | 4/2014 |
| EP | 2725300 A1 | 4/2014 |
| WO | 9964791 A1 | 12/1999 |
| WO | 0127614 A1 | 4/2001 |
| WO | 2006053826 A2 | 5/2006 |
| WO | 2011061059 A2 | 5/2011 |

OTHER PUBLICATIONS

Office Action (Communication) dated Jul. 5, 2019, by the European Patent Office in corresponding European Patent Application No. 13720866.6. (5 pages).

Office Action (Third Office Action) dated Dec. 26, 2016 by Chinese Patent Office in corresponding Chinese Patent Application No. 201380043933.2, and an English Translation of the Office Action (13 pages).

\* cited by examiner

SEQUENTIAL COMBUSTION WITH DILUTION GAS MIXER

CROSS-REFERENCE TO RELATED APPLICATIONS

This application is a divisional application of U.S. patent application Ser. No. 14/626,003, which claims priority to PCT/EP2013/058654 filed Apr. 25, 2013, which claims priority to European application 12181736.5, filed Aug. 24, 2012, both PCT/EP2013/058654 and European application 12181736.5 are hereby incorporated in their entireties.

TECHNICAL FIELD

The invention refers to a sequential combustor arrangement for a gas turbine with admixing dilution gas into the sequential combustor arrangement. The invention additionally refers to a method for operating a gas turbine with admixing dilution gas into a sequential combustor arrangement.

BACKGROUND

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and to increase operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Good cooling of the combustion chamber with low consumption of cooling gas is required for a safe and efficient operation of a gas turbine using such a sequential combustor arrangement. Conventional cooling methods either require heat exchanger structures which lead to high pressure drops in the main hot gas flow or suggest injection of a cooling medium from the side walls. Injection of a cooling gas reduces the main flow in the first combustor relative to the total mass flow which is detrimental to the efficiency of a gas turbine operated with such a sequential combustor arrangement and a controlled cooling of the whole flow is difficult.

SUMMARY

The object of the present disclosure is to propose a cooling scheme for a sequential combustor arrangement with a mixing section for dilution gas admixing between the first combustion chamber and the second burner. The dilution gas is admixed in the mixing section to provide proper inlet flow conditions for the second burner. In particular the hot gases are cooled to predetermined hot gas temperatures. Further, velocity and oxygen content can be conditioned for the second combustor.

Deviations from prescribed inlet temperatures may result in high emissions (e.g. NOx, CO, and unburned hydrocarbons) and/or flashback in the second burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increased NOx emission. Low temperature regions can cause CO emissions, due to the increased self-ignition time. This can reduce the time for CO to CO2 burnout, and a reduced local flame temperature, which can further slowdown the CO to CO2 burnout. Finally local hot spots may lead to overheating in certain regions downstream of the mixer.

To achieve a high efficiency of a gas turbine operating with a sequential combustor arrangement high combustion temperatures and in particular high combustor exit temperatures are required. To allow high combustion temperatures a good cooling scheme is prerequisite. Cooling gas has to be used efficiently and heat picked up by a cooling gas can advantageously be used in the combustion process.

According to an embodiment a sequential combustor arrangement comprises a first burner, a first combustion chamber, a mixing device for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner. Such a mixer comprises a duct having an inlet at an upstream end adapted for connection to the first combustion chamber and an outlet at a downstream end adapted for connection to the second burner. The sequential combustor arrangement further comprises four cooling zones:

- A first combustion chamber cooling zone with a first cooling channel which is delimited by a first combustion chamber wall and a first jacket, which is enclosing the first combustion chamber wall.
- A mixer cooling zone with a second cooling channel which is delimited by a mixer wall and a second jacket, which is enclosing the mixer wall.
- A second burner cooling zone with a third cooling channel which is delimited by a second burner wall and a third jacket, which is enclosing the second burner wall.
- A second combustion chamber cooling zone with a fourth cooling channel, which is delimited by a second combustion chamber wall and a fourth jacket, which is enclosing the second combustion chamber wall.

A cooling gas flows through the cooling channels during operation.

For air breathing gas turbine the cooling gas is typically air. For example for a gas turbine with flue gas recirculation the inlet air of the compressor is a gas comprising of a mixture of air and flue gas. Thus the cooling gas comprises of a mixture of air and flue gas. Cooling gas can further comprise steam or other components. In closed circuit gas turbines the cooling gas can for example be CO2 or N2.

According to one embodiment at least one cooling channel is fluidly connected to an adjacent cooling channel such that at least part of the cooling gas used for cooling in one cooling channel is further used for cooling in the adjacent cooling channel during operation.

In another embodiment at least three cooling channels are fluidly connected to each other in a row such that at least part of the cooling gas used for cooling in one cooling channel is further used for sequentially cooling the other two cooling channels during operation.

In yet another embodiment all four cooling channels are fluidly connected to each other in a row such that at least part of the cooling gas used for cooling in one cooling channel is further used for sequentially cooling the other cooling channels during operation.

A serial arrangement of cooling channels allows the effective reuse of cooling gas. Thus more compressor exit gas can be directly fed into the combustor than for an arrangement in which the cooling channels are fed with cooling gas in parallel.

According to another embodiment at least two cooling channels are directly connected to the exit of the compressor such that compressed gas leaving the compressor is admitted directly to the at least two cooling channels. This arrangement avoids prior heat pick up of the cooling gas in an interposed zone. Therefore cooling gas can be provided to the respective cooling channels at a relatively low temperature. Further, direct cooling gas supply to individual cooling channels reduces the pressure requirement for the cooling gas relative to a scheme with sequential cooling. The cooling gas only needs to be at a pressure which is required to overcome the pressure losses associated with flowing through one cooling channel.

The gas flow through the first burner can be significantly reduced by the use of cooling gas and dilution gas. To increase the flow through the first burner the dilution gas inlet can be fluidly connected to an outlet of cooling channel in an embodiment. In such an arrangement at least part of the cooling gas used for cooling in one cooling channel is admixed to the hot gases in the mixer during operation. This reuse of the cooling gas as dilution gas effectively reduces the amount of compressed gas, which is bypassed around the first burner.

According to an embodiment the second cooling channel is fluidly connected to the hot gas flow path of the second burner upstream of the second fuel gas injection. In this arrangement at least part of the cooling gas is fed into the second burner upstream of the second fuel injection after flowing through at least part of the second cooling cannels during operation.

According to a further embodiment the first burner is fluidly connected to an outlet of the first cooling channel. In this arrangement at least part of the cooling gas is fed into the first burner after flowing through at least part of the first cooling channel during operation In a further embodiment at least one cooling channel has an inlet at the downstream end with respect to the flow direction of the hot gas and an outlet opening at the upstream end of the cooling channel with respect to the flow direction of the hot gas. In such an arrangement at least part of the cooling gas flows in a counter flow to the hot gas flow direction during operation.

In addition or alternatively at least one cooling channel has an inlet at the upstream end with respect to the flow direction of the hot gas and an outlet opening at the downstream end of the cooling channel with respect to the flow direction of the hot gas. In such an arrangement at least part of the cooling gas flows in a co-current flow to the hot gas flow during operation.

The cooling flow in a cooling zone does not need to be in restricted to one direction for the whole zone. In one embodiment at least one cooling channel has an inlet between the downstream end and upstream end with respect to the flow direction of the hot gas. The cooling channel further has an outlet opening at the upstream end of the cooling channel with respect to the flow direction of the hot gas as well as an outlet opening at the downstream end of the cooling channel with respect to the flow direction of the hot gas. During operation at least part of the cooling gas flows in a counter flow to the hot gas flow direction from the inlet to the upstream outlet and in that at least part of the cooling gas flows in a co-current flow to the hot gas flow from the inlet to the downstream outlet.

This can for example be advantageous for a second combustion chamber cooling zone if the cooling gas flowing towards the downstream outlet is used to seal and cool the interface between combustion chamber and turbine. The cooling gas flowing towards the upstream outlet can be further used to cool the mixer. In addition it can also be used as dilution air and/or for further cooling.

Arranging a cooling zone with an outlet at an upstream end and an outlet at a downstream end can for example also be advantageous for a first combustion chamber cooling zone if the cooling gas flowing towards the upstream outlet is fed to the first burner. The cooling gas flowing towards the downstream outlet can be further used to cool the mixer. In addition it can also be used as dilution air.

According to one embodiment an outlet of a cooling channel is fluidly connected to the first burner. During operation at least part of the cooling gas is introduced into the first combustion chamber via the first burner after passing through this cooling channel.

According to a further embodiment a dilution gas inlet of the mixer is directly connected to the exit of the compressor. During operation compressed gas leaving the compressor can be directly fed to the dilution gas inlet without prior heat pick up in a cooling zone. With such an arrangement the dilution air needed to assure a required temperature reduction can be reduced. Such an arrangement can also be advantageous to provide dilution gas with a high pressure level, typically 1% to 5% (or higher) above the hot gas pressure in the mixer, for injection from the side walls of the mixer. This can be especially relevant for mixers with a large diameter or large equivalent diameter (typically more than 10 cm) to assure sufficient penetration of the injected dilution gas into the hot gas. A combination of direct injection with injection of dilution gas which has a been used as cooling gas and has a lower pressure level (0.2% to 1% or even up to 2% above the hot gas pressure in the mixer) can be advantageous for efficient use of cooling gas and cooling of the hot gas across the whole flow area. The lower pressure level dilution gas can be injected in the regions of the hot gas flow, which are close to the side walls of the mixer, while the high pressure dilution gas can be injected to the center of the hot gas flow.

Besides the sequential combustor arrangement a gas turbine comprising such a sequential combustor arrangement is subject of the present disclosure. Such a gas turbine comprises at least a compressor, a sequential combustor arrangement according to one of the embodiments of this disclosure, and a turbine.

In particular such a sequential combustor arrangement comprises a first burner, a first combustion chamber, a mixing device for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The sequential combustor arrangement further comprises four cooling zones:

A first combustion chamber cooling zone with a first cooling channel which is delimited by a first combustion chamber wall and a first jacket, which is enclosing the first combustion chamber wall.

A mixer cooling zone with a second cooling channel which is delimited by a mixer wall and a second jacket, which is enclosing the mixer wall.

A second burner cooling zone with a third cooling channel which is delimited by a second burner wall and a third jacket, which is enclosing the second burner wall.

A second combustion chamber cooling zone, with a fourth cooling channel which is delimited by a second combustion chamber wall and a fourth jacket, which is enclosing the second combustion chamber wall.

Besides the gas turbine a method for operating such a gas turbine is subject of the present disclosure. According to one embodiment of the method a cooling gas is fed to at least one cooling channel and flows through the cooling channels. In addition dilution gas is admixed to the hot gas leaving the first combustion chamber.

According to a further embodiment of the method at least part of the cooling gas in a cooling channel flows in a counter flow to the hot gas flow direction. In addition or alternatively at least part of the cooling gas in a cooling channel flows in a co-current flow to the hot gas flow direction.

In another embodiment at least part of the cooling gas used for cooling in a cooling channel is further used as dilution gas and admixed to the hot gas in the mixer. In addition or alternatively compressed gas from the compressor is admitted directly to the dilution gas inlet without prior heat pick up in a cooling zone, and admixed to the hot gas in the mixer.

A local high oxygen concentration can have a similar effect as a local high temperature, e.g. fast reaction leading to reduced the time for mixing, high combustion temperatures, increased NOx emissions and possibly flash back. A local low oxygen concentration can have a similar effect as a local low temperature, e.g. slow reaction leading to increased CO and UHC (unburned hydrocarbon) emissions.

Different types of mixers can be used. A mixer can comprise a hot gas duct with injection holes, coaxial injection holes with jet pump type injection from the side walls as described in the European patent application EP12181736, which is incorporated by reference.

A mixer can further comprise a plurality of injection pipes, which are pointing inwards from the walls of the duct for admixing the dilution gas to cool the hot flue gases leaving the first combustion chamber. The diameter, length and number of these pipes are designed to admix dilution gas into the hot gas flow such that the required dilution gas can be admixed with a low pressure drop. To reduce the inlet pressure drop rounded pipe inlets can be used.

The injection holes or pipes can also be combined with dampers or as connecters to damping volumes as described in the European patent application EP12189685, which is incooperated by reference.

The mixer can also comprise flutes or lobed mixers to admix the dilution gas into the hot gas flow.

The Mixer can be integrated into the downstream end of first combustion chamber or into the upstream end of second burner.

The gas turbine can include a flue gas recirculation system, in which a part of the flue gas leaving the turbine is admixed to the compressor inlet gas of the gas turbine.

Different cooling technologies might be used in the cooling zones. For example effusion cooling, impingement cooling or convective cooling or a combination of cooling methods can be used.

Referring to a sequential combustion the combination of combustors can be disposed as follows:

Both, the first and second combustors are configured as sequential can-can architecture.

The first combustor is configured as an annular combustion chamber and the second combustor is configured as a can configuration.

The first combustor is configured as a can-architecture and the second combustor is configured as an annular combustion chamber.

Both, the first and second combustor are configured as annular combustion chambers.

Different burner types can be used. For the first combustor so called EV burner as known for example from the EP 0 321 809 or AEV burners as known for example from the DE195 47 913 can for example be used. Also a BEV burner comprising a swirl chamber as described in the European Patent application EP12189388.7, which is incorporated by reference, can be used. In a can architecture a single or a multiple burner arrangement per can combustor can be used. Further, a flamesheet combustor as described in US2004/0211186, which is incorporated by reference, can be used as first combustor.

For the second burner with a fuel lance as known from the EP0623786, flutes, or lobed injection can for example be used.

BRIEF DESCRIPTION OF THE DRAWINGS

The disclosure, its nature as well as its advantages, shall be described in more detail below with the aid of the accompanying schematic drawings. Referring to the drawings.

DETAILED DESCRIPTION

Figure 1:
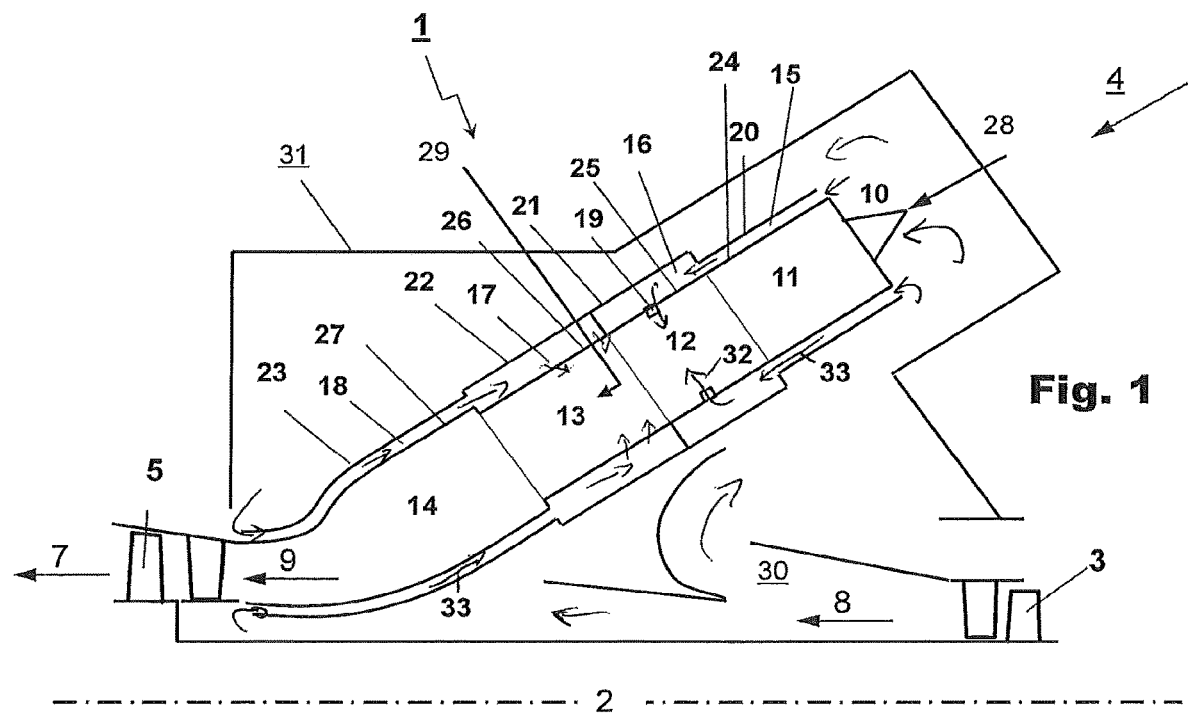
FIG. 1 shows a gas turbine with a sequential combustion arrangement with a mixer for admixing dilution gas and four cooling zones.

FIG. 1 shows a gas turbine 1 with a sequential combustor arrangement 4 according to the disclosure. It comprises a compressor 3, a sequential combustor arrangement 4, and a turbine 5.

The sequential combustor arrangement 4 comprises a first burner 10, a first combustion chamber 11, and a mixer 12 for admixing a dilution gas 32 to the hot gases leaving the first combustion chamber 11 during operation. Downstream of the mixer 12 the sequential combustor arrangement 4 further comprises a second burner 13, and a second combustion chamber 14. The first burner 10, first combustion chamber 11, mixer 12, second burner 13 and second combustion chamber 14 are arranged sequentially in a fluid flow connection. The sequential combustor arrangement 4 is housed in a combustor casing 31. The compressed gas 8 leaving the compressor 8 passes through a diffusor 30 for at least partly recovering the dynamic pressure of the gas leaving the compressor.

The sequential combustor arrangement 4 further comprises a first combustion chamber cooling zone with a first cooling channel 15 which is delimited by the first combustion chamber wall 24 and a first jacket 20, which is enclosing the first combustion chamber wall 24. It comprises a mixer cooling zone with a second cooling channel 16 which is delimited by a mixer wall 25 and a second jacket 21, which is enclosing the mixer wall 25. It comprises a second burner cooling zone with a third cooling channel which is delimited by a second burner wall 26 and a third jacket 22, which is enclosing the second burner wall 26. It also comprises a second combustion chamber cooling zone with a fourth cooling channel 18, which is delimited by a second combustion chamber wall 27, and a fourth jacket 23, which is enclosing the second combustion chamber wall (27).

Compressed gas 8 is fed into the first cooling channel 15 as cooling gas 33 at an upstream end (relative to the hot gas flow direction) and flows through the first cooling channel 15 parallel to the main flow direction of the hot gas flow in the first combustion chamber 11. After passing through the first cooling channel 15 the cooling gas 33 enters the second cooling channel for cooling the mixer. After at least partly cooling the mixer cooling gas 33 is fed into the dilution gas inlet 19 and admixed to the hot gas as dilution gas 32 in the mixer 12.

Compressed gas 8 is also fed into the fourth cooling channel 18 as cooling gas 33 at a downstream end (relative to the hot gas flow direction) and flows in counterflow to the main flow direction of the hot gas flow in the second combustion chamber 14. After passing through the fourth cooling channel 18 the cooling gas 33 enters the third cooling channel 17 at a downstream end (relative to the hot gas flow direction) and flows in counterflow to the main flow direction of the hot gas flow in the second burner 13. After cooling the second combustion chamber wall 27 and the second burner wall 26 the cooling gas 33 is fed to the second burner 13. The cooling gas 33 can for example be fed to the second burner 13 as cooling gas, e.g. as film cooling gas or diffusion cooling. Part of the cooling gas 33 can already be fed to the hot gas 9 in the second combustion chamber 14 during cooling of the second combustion chamber wall 27 (not shown).

Fuel can be introduced into the first burner 10 via a first fuel injection 28, mixed with compressed gas 8 which is compressed in the compressor 3, and burned in the first combustion chamber 11. Dilution gas 32 is admixed in the subsequent mixer 12. Additional fuel can be introduced into the second burner 13 via a second fuel injection 29, mixed with hot gas leaving the mixer 12, and burned in the second combustion chamber 14. The hot gas leaving the second combustion chamber 14 is expanded in the subsequent turbine 5, performing work. The turbine 5 and compressor 3 are arranged on a shaft 2.

The remaining heat of the exhaust gas 7 leaving the turbine 5 can be further used in a heat recovery steam generator or boiler (not shown) for steam generation.

In the example shown here compressed gas 8 is admixed as dilution gas 32. Typically compressor gas 8 is compressed ambient air. For gas turbines with flue gas recirculation (not shown) the compressor gas is a mixture of ambient air and recirculated flue gas.

Typically, the gas turbine system includes a generator (not shown) which is coupled to a shaft 2 of the gas turbine 1. The gas turbine 1 further comprises a cooling system for the turbine 5, which is also not shown as it is not subject of the invention.

Different exemplary embodiments of the cooling arrangement and of the burners are shown in FIGS. 2 to 8. For simplification only the sequential combustor arrangement 4 is shown in these Figures and the other gas turbine components such as compressor and turbine are omitted.

Figure 2:
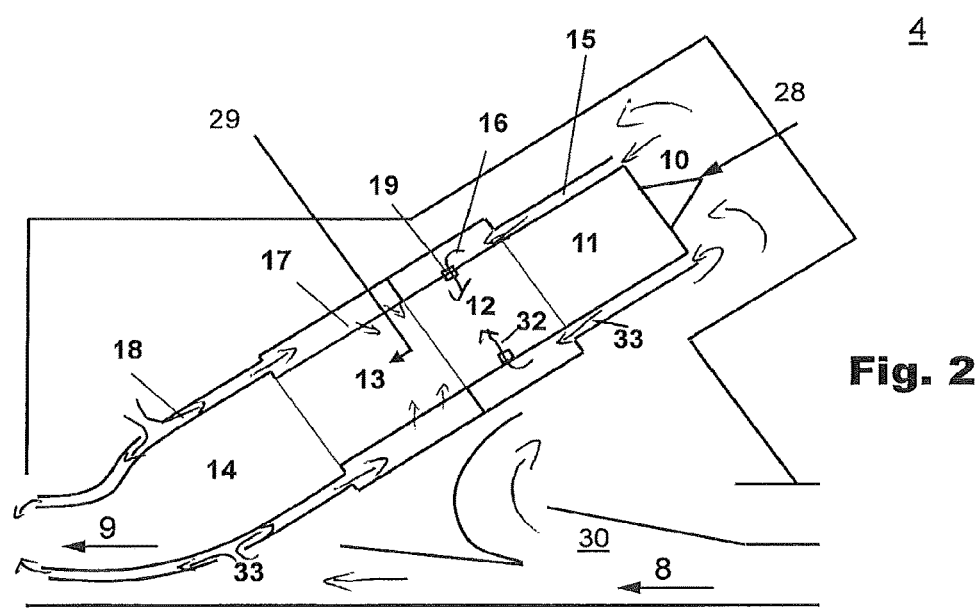
FIG. 2 shows a sequential combustion arrangement with a cooling channel which is partly cooled by cooling gas in cocurent flow to the hot gas flow and partly cooled by a cooling gas in counter flow to the hot gas flow.

The embodiment of FIG. 2 differs from the embodiment of FIG. 1 in that the cooling gas 33 is fed to the fourth cooling channel 18 at a location between the upstream and downstream end of the fourth cooling channel 18. From the fed location part of the cooling gas 33 flows in counterflow to the main flow direction of the hot gas flow in the second combustion chamber 14. After passing through the fourth cooling channel 18 the cooling gas 33 enters the third cooling channel 17 at a downstream end like in the example of FIG. 1. The remaining cooling gas 33, which is fed into the fourth cooling channel 18 flows through the fourth cooling channel 18 parallel to the main flow direction of the hot gas flow in the second combustion chamber 14. After passing through the downstream end of the fourth cooling channel 18 the cooling gas 33 is used as cooling and sealing gas at the interface to the turbine.

Figure 3:
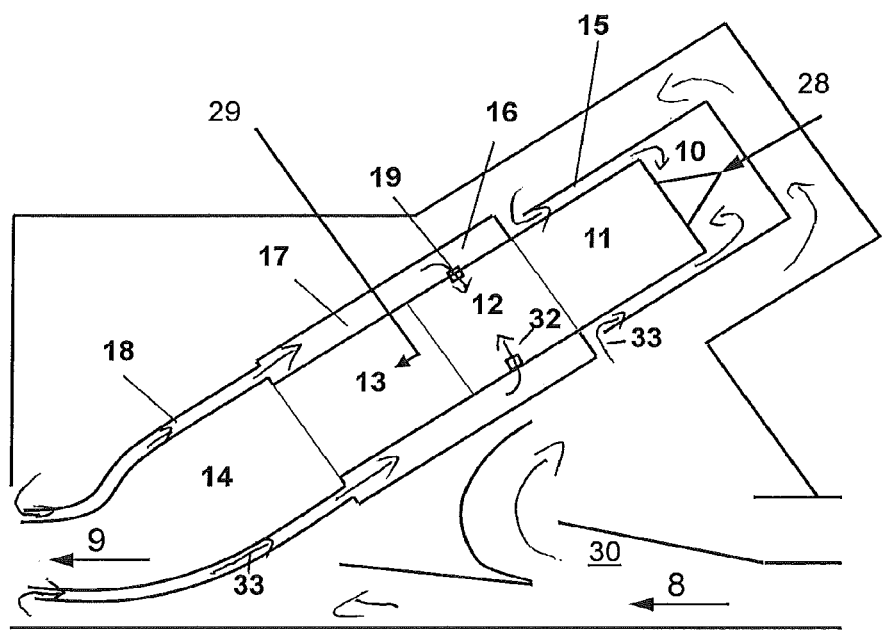
FIG. 3 shows a sequential combustion arrangement with serial cooling of cooling zones and subsequent use of the cooling gas as dilution gas.

The embodiment of FIG. 3 differs from the embodiment of FIG. 1 in that the second cooling channel 16 and the third cooling channel 17 are fluidly connected and in that cooling gas 33 continues to flow in counterflow to the main flow direction of the hot gas flow in the mixer 12 after it passed through the third cooling channel 17. After at least partly cooling the mixer wall the cooling gas 33 is fed into the dilution gas inlet 19 and admixed to the hot gas in the mixer 12.

The embodiment of FIG. 3 further differs from the embodiment of FIG. 1 in that first cooling channel 15 is not cooled in parallel flow but in counterflow.

For cooling the first combustion chamber 11 compressed gas 8 is fed into the first cooling channel 15 as cooling gas 33 at an downstream end (relative to the hot gas flow direction) and flows in counterflow to the main flow direction of the hot gas flow in the first combustion chamber 11.

After passing through the cooling channel 15 the cooling gas 33 is fed to the first burner 10.

In this example only cooling gas 33 is fed to the first burner 10. Additional compressed gas 8 can be directly fed to the first burner (not shown).

Figure 4:
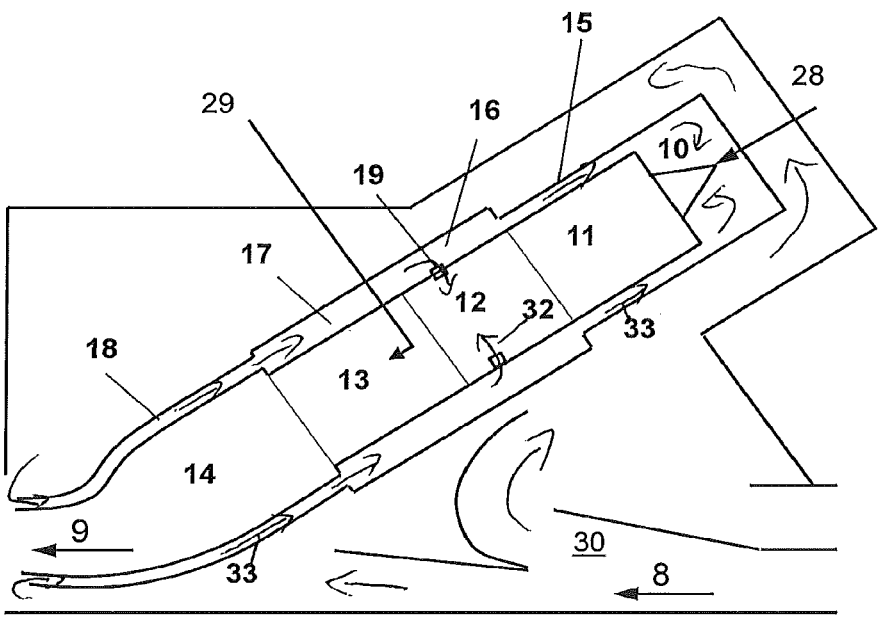
FIG. 4 shows a sequential combustion arrangement with serial cooling of cooling zones and subsequent use of the cooling gas as dilution gas and subsequent use of cooling gas in the first burner.

FIG. 4 shows a sequential combustion arrangement with serial cooling of the cooling zones and subsequent use of the cooling gas 33 as dilution gas 32 and subsequent use of cooling gas 33 in the first burner 10. In contrast to the example of FIG. 1 all four cooling channels 15, 16, 17, 18 are fluidly connected. Compressed gas 8 is fed into the fourth cooling channel 18 as cooling gas 33 at a downstream end (relative to the hot gas flow direction) and flows in counterflow to the main flow direction of the hot gas flow in the second combustion chamber 14. At least part of the cooling gas 33 flows through the fourth cooling channel 18, through the third cooling channel 17, through the second cooling channel 16 and through the first cooling channel 15 in series.

After at least partly cooling the mixer wall part of the cooling gas 33 is fed into the dilution gas inlet 19 and admixed to the hot gas as dilution gas 32 in the mixer 12.

After passing through the first cooling channel 15 the remaining cooling gas 33 is fed to the first burner 10.

In this example only cooling gas 33 is fed to the first burner 10. Additional compressed gas 8 can be directly fed to the first burner (not shown).

Figure 5:
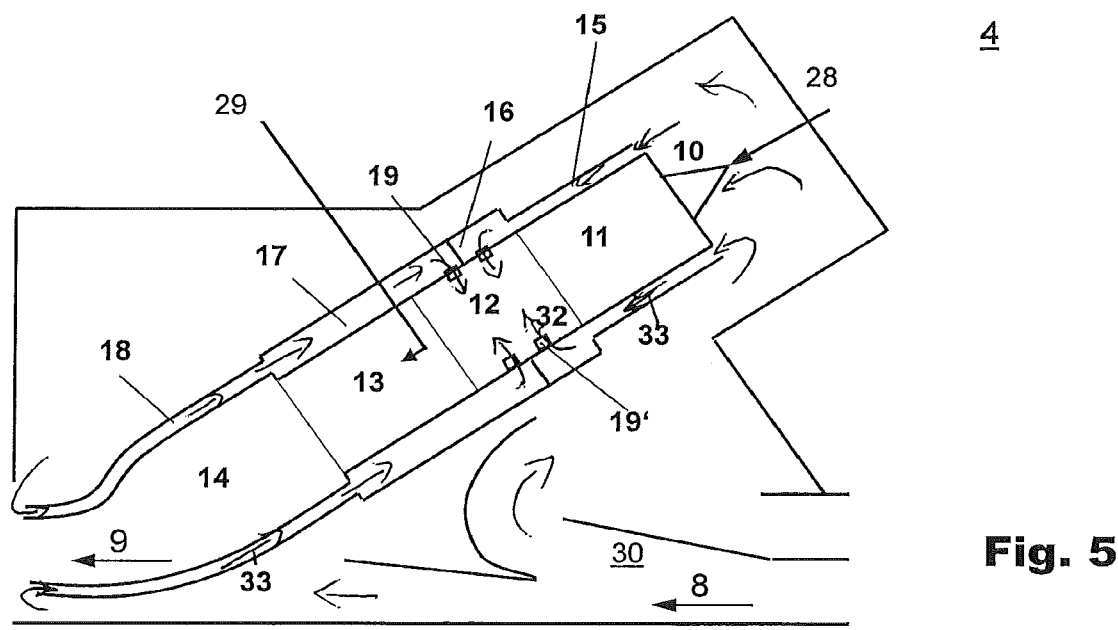
FIG. 5 shows a sequential combustion arrangement with cocurent cooling gas flow to the hot gas flow with subsequent use of the cooling gas as dilution gas and cooling gas flow in counter flow to the hot gas flow with subsequent use of the cooling gas as dilution gas.

The embodiment of FIG. 5 differs from the embodiment of FIG. 1 in that the second cooling channel 16 is split into two sections. A first section is fluidly connected to the first cooling channel 15 and cooling gas 33 enters the second cooling channel for cooling the mixer wall from the first cooling channel 15. After at least partly cooling the mixer wall the cooling gas 33 is fed into a dilution gas inlet 19' and admixed to the hot gas as dilution gas 32 in the mixer 12.

A second section of the second cooling channel 16 is fluidly connected to the third cooling channel 17 and cooling gas 33 enters the second cooling channel for cooling the mixer wall. After at least partly cooling the mixer the cooling gas 33 is fed into a dilution gas inlet 19 and admixed to the hot gas as dilution gas 32 in the mixer 12.

Figure 6:
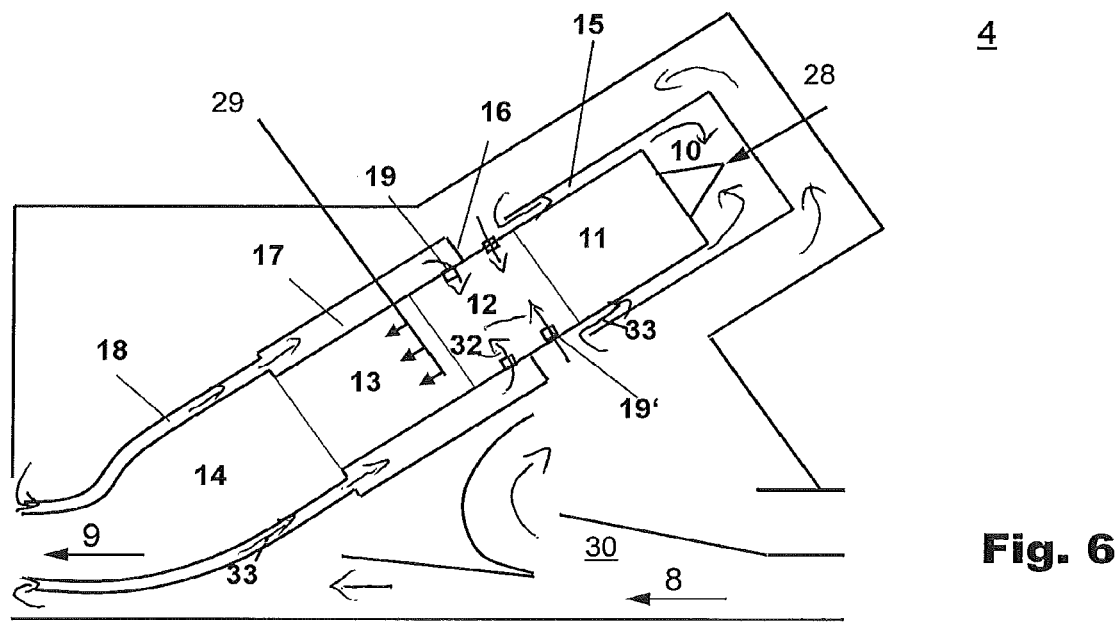
FIG. 6 shows a sequential combustion arrangement with subsequent use of cooling gas as dilution gas and direct injection of compressor exit gas as dilution gas.

The embodiment of FIG. 6 is based on FIG. 3. In this example the second cooling channel 16 does not extend along the full length of the mixer 12. At an upstream end the mixer is directly accessed by compressed gas 8. Compressed gas 8 is directly fed to an additional dilution gas inlet 19' and admixed to the hot gas as dilution gas 32 in the mixer 12.

Figure 7:
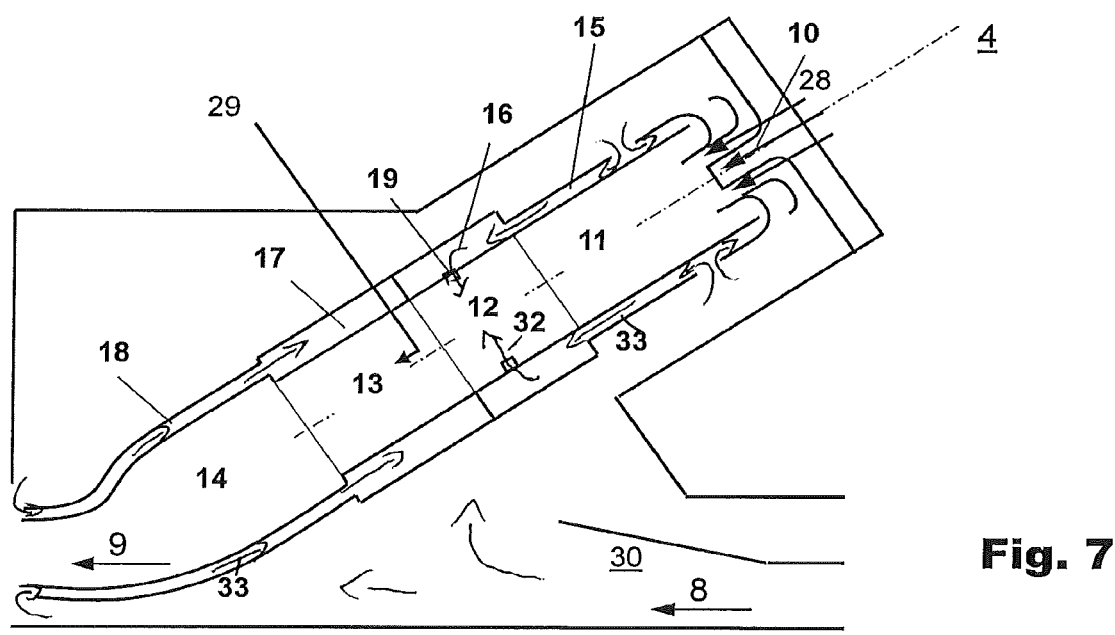
FIG. 7 shows a sequential combustion arrangement in can architecture and with a flame sheet burner.

The embodiment of FIG. 7 is based on FIG. 1. In this example cooling gas 33 is fed to the first cooling channel 15 at a location between the upstream and downstream end of the first cooling channel 15. From the fed location part of the cooling gas 33 flows in counterflow to the main flow direction of the hot gas flow in the first combustion chamber 11. After passing through the first cooling channel 15 this cooling gas 33 is fed to the burner 10.

The remaining cooling gas 33, which is fed into the first cooling channel 15 flows through the first cooling channel 15 parallel to the main flow direction of the hot gas flow in the first combustion chamber 11. After passing through the first cooling channel 15 the cooling gas 33 enters the second cooling channel 16 at an upstream end like in the example of FIG. 1.

Further, FIG. 7 shows a sequential combustion arrangement in a can architecture and with a flame sheet burner. In this example compressed gas 8 is directly fed to the burner 10 in addition to cooling gas 33.

Figure 8:
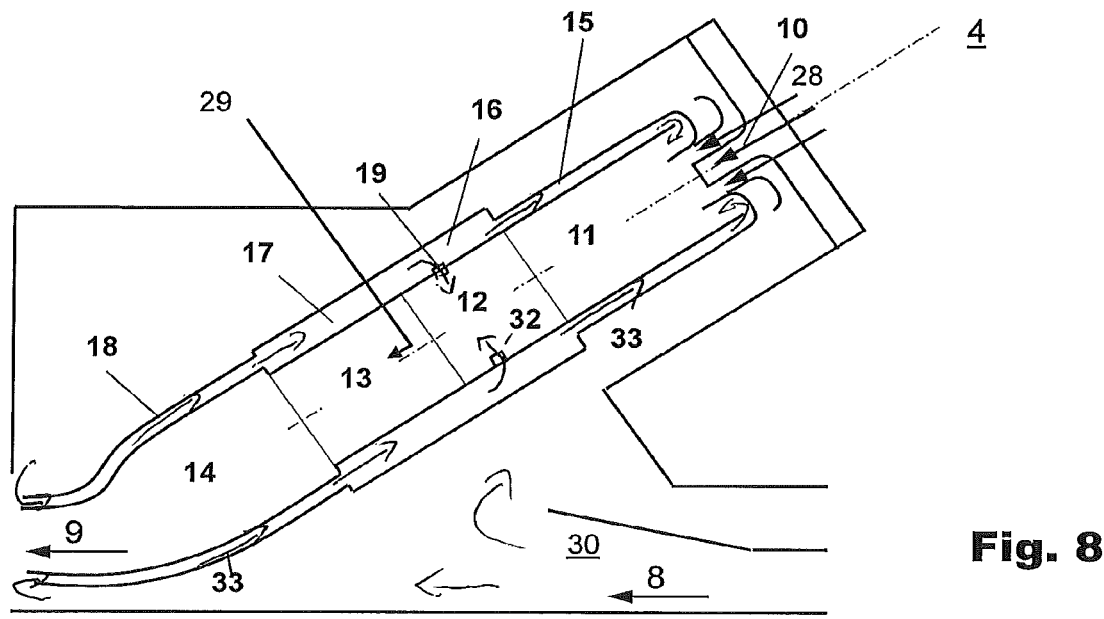
FIG. 8 shows a sequential combustion arrangement in can architecture and with a flame sheet burner, with serial cooling of cooling zones and subsequent use of the cooling gas as dilution gas and subsequent use of cooling gas in the first burner.

The embodiment of FIG. 8 is based on FIG. 4. In this example the cooling scheme is unchanged but a sequential combustion arrangement in can architecture and with a flame sheet burner is shown.

Figure 9:
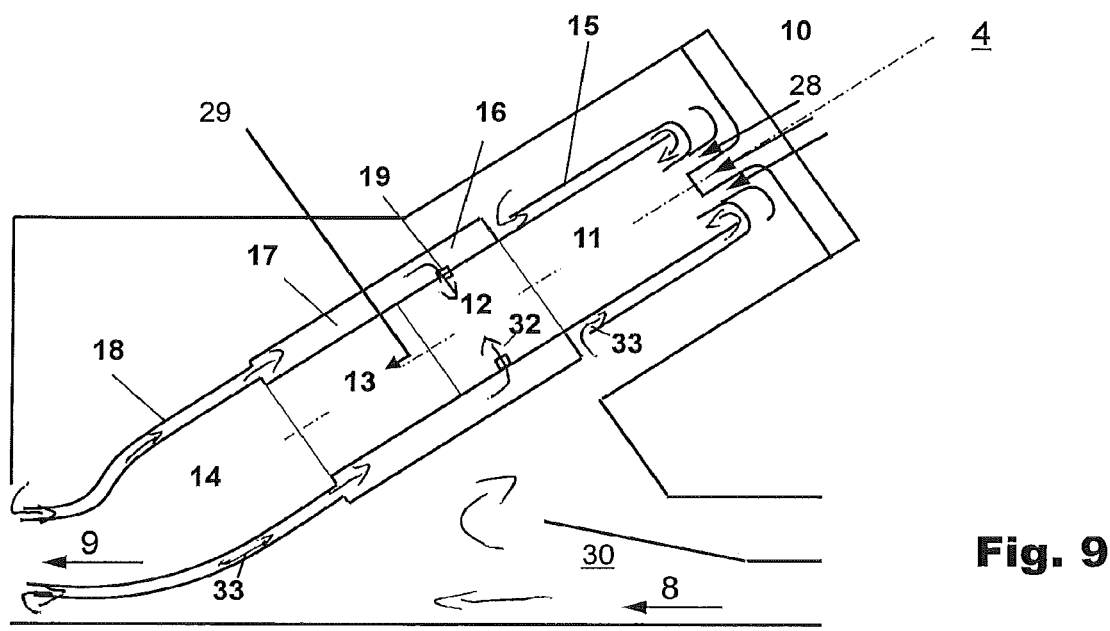
FIG. 9 shows a sequential combustion arrangement, with a flame sheet burner, with serial cooling of cooling zones and subsequent use of the cooling gas as dilution gas.

The embodiment of FIG. 9 is based on FIG. 3. In this example the cooling scheme is unchanged but a sequential combustion arrangement in can architecture and with a flame sheet burner is shown.

For all shown arrangements can or annular architectures or any combination of the two is possible. EV, AEV or BEV burners can be used for can as well as for annular architectures.

The mixing quality of the mixer 12 is crucial for a stable clean combustion since the burner system of the second combustion chamber 14 requires a prescribed inlet conditions.

All the explained advantages are not limited to the specified combinations but can also be used in other combinations or alone without departing from the scope of the disclosure. Other possibilities are optionally conceivable, for example, for deactivating individual burners or groups of burners at part load operation. Further, the cooling gas and the dilution gas can be re-cooled in a cooling gas cooler before use as cooling gas, respectively as dilution gas.

The invention claimed is:

1. A sequential combustor arrangement comprising:
  a first burner;
  a first combustion chamber;
  a mixer for admixing a dilution gas to the hot gases leaving the first combustion chamber during operation;
  a second burner; and
  a second combustion chamber arranged sequentially in a fluid flow connection, wherein the mixer is configured to guide combustion gases in a hot gas flow path extending between the first combustion chamber and the second burner;
  the mixer having a duct with an inlet at an upstream end configured for connection to the first combustion chamber and an outlet at a downstream end configured for connection to the second burner;
  a first combustion chamber cooling zone with a first cooling channel which is delimited by a first combustion chamber wall and a first jacket, which encloses the first combustion chamber wall;
  a mixer cooling zone with a second cooling channel which is delimited by a mixer wall and a second jacket, which encloses the mixer wall;
  a second burner cooling zone with a third cooling channel which is delimited by a second burner wall and a third jacket, which encloses the second burner wall; and
  a second combustion chamber cooling zone, with a fourth cooling channel which is delimited by a second combustion chamber wall and a fourth jacket, which encloses the second combustion chamber wall, the first, second, third, and fourth cooling channels being arranged such that a cooling gas will flow through the cooling channels during operation;
  the mixer having a dilution gas inlet directly connected to at least one exit of the compressor such that a first portion of compressed gas leaving the compressor will be admitted directly to the dilution gas inlet as a portion of the dilution gas without prior heat pick up in a cooling zone during operation;
  wherein the fourth cooling channel is connected to the at least one exit of the compressor to receive a second portion of the compressed gas from the compressor as a portion of the cooling gas to cool the second combustion chamber wall and subsequently pass the second portion of the compressed gas to the third cooling channel to cool the second burner wall during operation; and wherein the second cooling channel is connected to the at least one exit of the compressor such that a third portion of the compressed gas is passable into the second cooling channel as a portion of the cooling gas to cool the mixer wall during operation and the first cooling channel is connected adjacent to the dilution gas inlet such that at least some of the dilution gas bypasses the dilution gas inlet and passes to the first cooling channel to cool the first combustion chamber wall during operation.

2. The sequential combustor arrangement of claim 1, wherein the third cooling channel is connected to the mixer to feed the second portion of the compressed gas to the mixer as a portion of the dilution gas to be admixed with the hot gases during operation; and/or wherein the second cooling channel is connected to the mixer so that some of the third portion of the compressed gas is passable from the second cooling channel to the mixer as a portion of the dilution gas for admixing with the hot gases during operation.

3. The sequential combustor arrangement of claim 1, wherein at least three of the first, second, third, and fourth cooling channels are fluidly connected to each other in a row such that at least part of the cooling gas used for cooling in one cooling channel will be further used for sequentially cooling the other two cooling channels during operation.

4. The sequential combustor arrangement of claim 1, wherein the at least two cooling channels of the first, second, third, and fourth cooling channels are directly connected to the exit of the compressor such that compressed gas leaving the compressor will be admitted directly to the at least two cooling channels without prior heat pick up in an interposed cooling zone.

5. The sequential combustor arrangement of claim 1, wherein the second cooling channel is connected to the mixer so that some of the third portion of the compressed gas is passable from the second cooling channel into the mixer as a portion of the dilution gas for admixing with the hot gases from the first combustion chamber during operation.

6. The sequential combustor arrangement as claimed in claim 1, wherein at least one cooling channel of the first, second, third, and fourth cooling channels has an inlet at a downstream end with respect to a flow direction of hot gas and an outlet opening at an upstream end with respect to the flow direction of the hot gas and wherein at least part of the cooling gas flows in a counter flow to the hot gas flow direction during operation.

7. A method for operating a gas turbine with at least a compressor, a sequential combustor arrangement having a first burner, a first combustion chamber, a mixer for admixing a dilution gas to hot gases leaving the first combustion chamber, a second burner, and a second combustion chamber arranged sequentially in a fluid flow connection, the method comprising:

guiding, via the mixer combustion gases in a hot gas flow path extending between the first combustion chamber and the second burner via a duct having an inlet at an upstream end configured for connection to the first combustion chamber and an outlet at a downstream end configured for connection to the second burner, the sequential combustor arrangement including a first combustion chamber cooling zone with a first cooling channel which is delimited by a first combustion chamber wall and a first jacket, which encloses the first combustion chamber wall, a mixer cooling zone with a second cooling channel which is delimited by a mixer wall and a second jacket, which encloses the mixer wall, a second burner cooling zone with a third cooling channel which is delimited by a second burner wall and a third jacket, which encloses the second burner wall, and a second combustion chamber cooling zone, with a fourth cooling channel which is delimited by a second combustion chamber wall and a fourth jacket, which encloses the second combustion chamber wall, the method comprising:

feeding and guiding a cooling gas through the cooling channels, the feeding and guiding of the cooling gas through the cooling channels including:
feeding a first portion of compressed gas from the compressor to the fourth cooling channel as a portion of the cooling gas to cool the second combustion chamber wall and subsequently passing the second portion of the compressed gas to the third cooling channel to cool the second burner wall, and
feeding a second portion of the compressed gas into the second cooling channel as a portion of the cooling gas to cool the mixer wall; and admixing the dilution gas to the hot gases leaving the first combustion chamber in the mixer, the admixing of the dilution gas including:
feeding a third portion of the compressed gas to a dilution gas inlet of the mixer without prior heat pick up in a cooling zone during operation; and bypassing a portion of the dilution gas past the dilution gas inlet to an adjacent inlet of the first cooling channel to cool the first combustion chamber wall.

8. The method of claim 7, wherein at least part of the cooling gas in a cooling channel flows in a counter flow to a hot gas flow direction, and/or at least part of the cooling gas in a cooling channel flows in a co-current flow to the hot gas flow direction.

9. The method of claim 8, wherein the mixer has a dilution gas exit connected to the compressor so that the third portion of the compressed gas passes from the compressor to the mixer for admixing without contacting the first combustion chamber wall, without contacting the second burner wall, and without contacting the second combustion chamber wall.

10. The method of claim 7, wherein the feeding and guiding of the cooling gas through the cooling channels occurs such that:
a portion of the cooling gas is passed through the first cooling channel to the first burner in a direction that is counterflow to a main flow direction of hot gas flowing through the first combustion chamber, and/or
a portion of the cooling gas is passed through the first cooling channel toward the second cooling channel in a direction that is co-current with the main flow direction of the hot gas flowing through the first combustion chamber.

11. The method of claim 7, comprising:
feeding a portion of the compressed gas to a first burner that is upstream of the first combustion zone.

12. The method of claim 7, wherein at least two of the first cooling channel, the second cooling channel, the third cooling channel, and the fourth cooling channel are directly connected to the compressor such that compressed gas leaving the compressor will be admitted directly to these cooling channels without prior heat pick up in an interposed cooling zone.

13. The method of claim 7, wherein the admixing of the dilution gas to the hot gases leaving the first combustion chamber in the mixer also includes:
    feeding the first portion of the compressed gas from the third cooling channel to the mixer as a portion of the dilution gas for admixing with the hot gases.

14. The method of claim 13, wherein the admixing of the dilution gas to the hot gases leaving the first combustion chamber in the mixer also includes:
    passing some of the second portion of the compressed gas from the second cooling channel to the mixer as a portion of the dilution gas for admixing with the hot gases.

15. The method of claim 7, wherein the admixing of the dilution gas to the hot gases leaving the first combustion chamber in the mixer also includes:
    passing some of the second portion of the compressed gas from the second cooling channel to the mixer as a portion of the dilution gas for admixing with the hot gases.

\* \* \* \* \*